Feb. 27, 1940.   R. C. UPTON   2,191,872
VARIABLE SPEED ELECTRIC MOTOR
Filed Aug. 30, 1937   2 Sheets-Sheet 1

INVENTOR
RICHARD C. UPTON
BY
ATTORNEYS

Feb. 27, 1940.                R. C. UPTON                2,191,872
                    VARIABLE SPEED ELECTRIC MOTOR
                     Filed Aug. 30, 1937       2 Sheets-Sheet 2

*INVENTOR*
RICHARD C. UPTON
BY Whittemore Hulbert & Belknap
*ATTORNEYS*

Patented Feb. 27, 1940

2,191,872

UNITED STATES PATENT OFFICE 2,191,872

VARIABLE SPEED ELECTRIC MOTOR

Richard C. Upton, Mount Clemens, Mich., assignor of one-eighth to Arch N. Goddard, one-eighth to Chester S. Goddard, one-eighth to Ernest E. Anderson, and one-eighth to Howard Hagerty, all of Detroit, Mich.

Application August 30, 1937, Serial No. 161,645

13 Claims. (Cl. 172—36)

This invention relates to improvements in motors and has particular reference to means for varying the speed of electric motors.

One of the principal objects of the invention is the provision of a variable speed electric motor capable of driving a load at any speed within wide speed ranges.

Another object of the invention is the provision of a variable speed motor adapted to deliver a maximum load torque with mechanism of a minimum size, thus effecting a considerable saving in the cost of manufacturing the motor.

A further object is to provide an electric motor having a revoluble field and a revoluble armature, and to provide means for varying the speeds of both the field and armature.

An advantageous feature of the invention resides in the fact that a load may be driven from either the armature shaft or the field shaft, thereby greatly increasing the range of speeds available. In addition to the wider speed range obtainable, greater power capacity is provided since the variable speed mechanism associated with the motor is only required to transmit a portion of the load torque.

A still further object of the invention is the provision of a device of the character described wherein working parts of the mechanism are frequently permitted to run at relatively low speeds. This is advantageous when a unit of the cone drive type is employed, since at low speeds greater pressure can be applied between the friction members and a correspondingly greater output torque obtained. In addition, the wear of parts is appreciably reduced.

Another object of the present invention is the provision of a variable speed motor in which accurate adjustment of the speed is easily made. This is made possible by the fact that the armature shaft may be used for one speed range and the field shaft for another, thereby permitting a smaller speed variation in proportion to increments of adjustment. This insures more stable operation and control.

Figure 1:
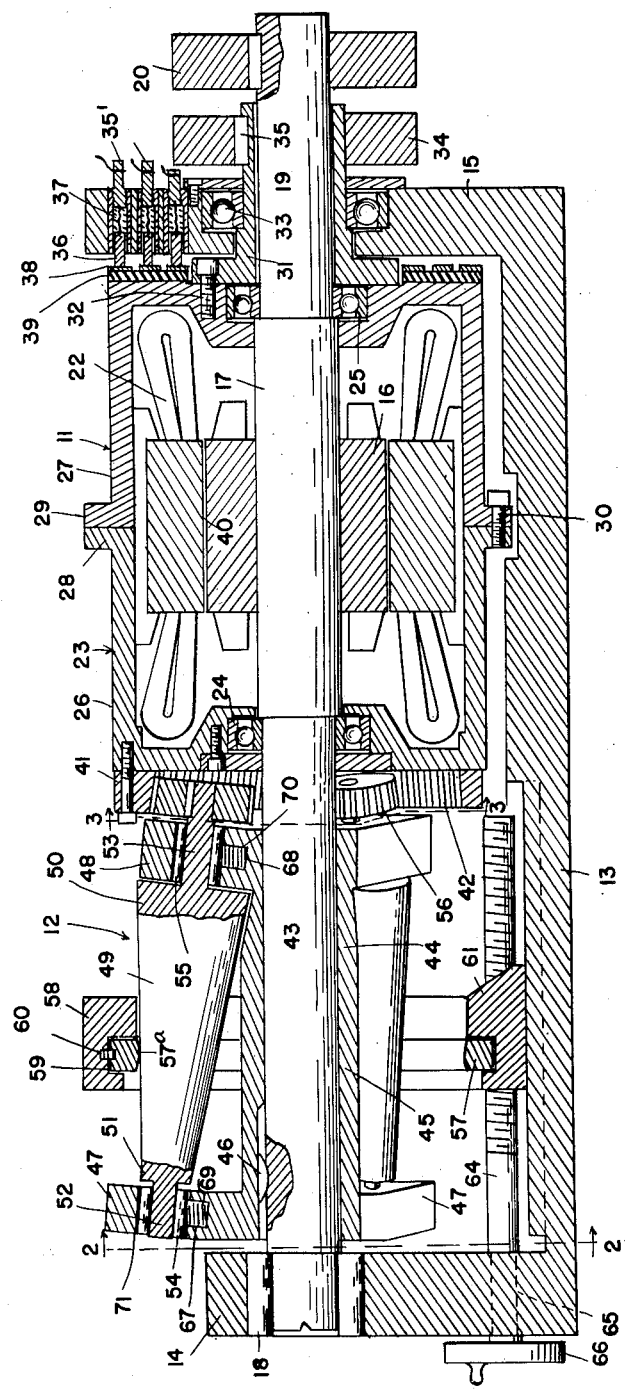
Figure 2:
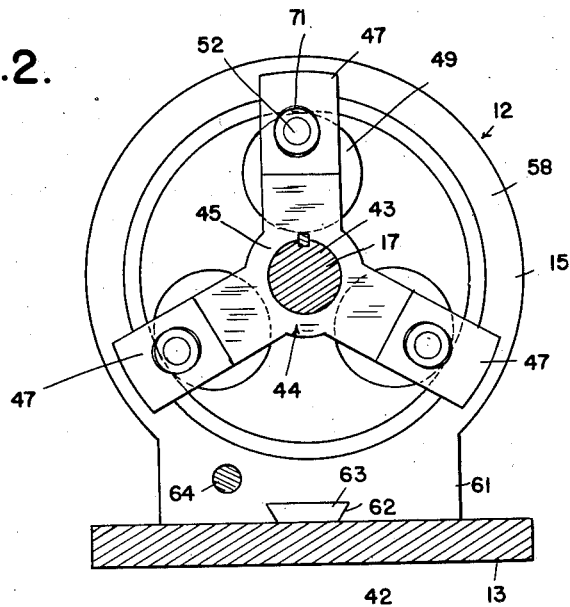
Figure 3:
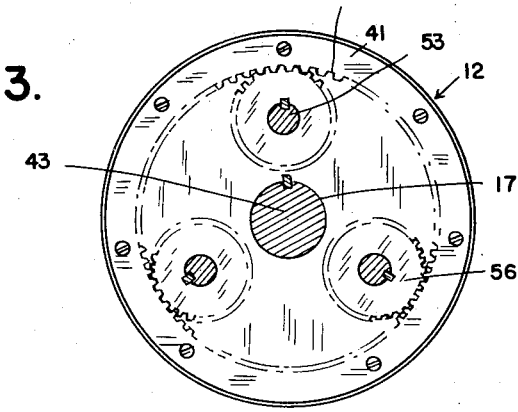

Other objects and advantages of the invention will be apparent from the following description, especially when considered in connection with the accompanying drawings, wherein Figure 1 is a longitudinal sectional view of the device, taken substantially on the plane indicated by the line 14 of Figure 2;

Figure 2 is a cross section taken substantially on the line 2—2 of Figure 1; and Figure 3 is a cross section taken substantially on the line 3—3 of Figure 1.

The embodiment of the invention disclosed herein comprises an electric motor 11 and a variable speed transmission unit 12. The motor 11 is of conventional design with the exception that both the field and the armature are mounted for rotation relative to the base.

As shown in Figure 1, the motor 11 and the transmission unit 12 are mounted upon the base 13 which is provided with the upright end members 14 and 15. The armature 16 of the motor is carried by a shaft 17 which extends the entire length of the base 13, being rotatably mounted therein by means of bearings 18. The forward end 19 of the shaft 17 extends through the upright 15 and carries a drive pulley 20 at its outer extremity. A key 21 is employed to secure the pulley 20 to the shaft.

The field coils 22 of the motor are mounted within a housing 23 which is rotatably journaled upon the armature shaft 17 by means of bearings 24 and 25. To enable the interior of the motor to be readily accessible for repairs, the housing 23 is formed of two complementary sections 26 and 27 which are provided with bolting flanges 28 and 29 respectively for receiving the fastening elements 30. A sleeve 31 is secured to the forward end of the field housing 23 by means of studs 32 and projects through the upright end member 15 of the base, being journaled therein by means of the bearings 33. The inner diameter of the sleeve 31 is slightly larger than the outside diameter of the armature shaft 17 to permit frictionless relative motion therebetween. A drive pulley 34 is secured to the outer end of the sleeve 31 by means of the key 35.

From the above description it will be apparent that both the armature 17 and the field 22 are arranged for independent rotation relative to the base 13. The motor 11, shown herein, is of the squirrel cage polyphase induction type and is actuated in accordance with conventional practice from a suitable source of electrical power applied to the motor terminals 35'. The terminals 35' are mounted in the upright 15 and are electrically connected to the brushes 36, the latter being slidably mounted in the upright 15 in axial registration with the motor terminals. Suitable compression springs 37 are interposed between the terminals 35' and the brushes 36 and serve to maintain the brushes in engagement with the contacts 38 which are positioned upon the forward end of the field housing 23 and insulated therefrom by the dielectric 39. The contacts 38 are connected to the proper portions of the field winding 22. It will of course be understood that I do not intend to limit myself to the specific type of prime mover described herein, since other types of motors may be advantageously used with the present invention.

Inasmuch as the field and the armature are each arranged for independent rotation, it follows that the torque created in the air gap 40 between the field and armature coils will tend to rotate the field in one direction and the armature in the opposite direction. The relative speed between the field and the armature, which of course is equal to the sum of the absolute speeds of the field and the armature relative to the base, is dependent upon the particular motor used, and is substantially constant for a given installation. In this connection it should be noted that power to drive external machines or the like may be taken either from the pulley 20 on the armature shaft, or from the pulley 34 which is rotated as a unit with the field.

The variable speed transmission unit 12 is arranged to cooperate with the motor 11 to enable power to be taken from the pulleys 20 and 34 at a multiplicity of different speeds. In the present instance the unit may be adjusted to obtain any speeds from zero speed to half speed from the pulley 34 associated with the field 22, and from half speed to full motor speed from the pulley 20 on the armature shaft. It will be understood that the term "full motor speed" has reference to the rated speed of the motor 11, or in other words, the relative speed between the field and the armature. To achieve the above mentioned results the transmission unit 12 is arranged to perform two principal functions. First, the unit enables the field and armature to rotate relative to each other at definite speed ratios which may be readily changed to secure the output speeds desired. Secondly, the unit provides a reaction for the rotating field and armature coils.

With reference to Figure 1, it will be noted that a ring gear 41 having the internal bevel gear teeth 42 is secured to one end of the field housing 23. The armature shaft 17 has a rearwardly extending portion 43 upon which is mounted the spider 44. The spider 44 has an axially extending portion 45 which is keyed at 46 to the armature shaft 17, and is provided with arms 47 and 48 at either end which extend in generally radial directions. The arms 47 are three in number and are arranged in uniform angular relation to each other, and the three arms 48 are positioned in axial registration therewith. Journaled in the arms 47 and 48 are cones 49, which have their maximum diameters at the ends 50 adjacent the arms 48 and are uniformly tapered to a smaller diameter at the ends 51 adjacent the arms 47. The ends of the cones have reduced portions 52 and 53 which are rotatably mounted in the bearings 54 and 55 carried by the arms 47 and 48 respectively. Secured to the forward end of the cones are small planet gears 56 which are arranged to mesh with the gear teeth 42 of the ring gear 41. The cones 49 are mounted at an angle to the shaft 17 corresponding to the taper of the cone. With this arrangement the outer edges of the cones are maintained parallel to the axis of the armature shaft.

A contact ring 57 is positioned to engage the outer edges of the cones 49 and is adapted to be axially adjusted to vary the ratio between the field and armature speeds. In detail the ring 57 is carried by a yoke 58 which extends completely around the cones 49. The contact ring 57 is seated in a groove 59 formed in the inner periphery of the yoke, and is prevented from rotating by a key 60. The inner surface 57a of the contact ring is curved, and the central portion thereof is positioned for engagement by the outer edges of the cones 49. The lower portion 61 of the yoke 58 is formed with a groove 62 adapted to engage a track 63 extending longitudinally upon the base 13. In order to insure that the yoke 58 will maintain its proper alignment as it is shifted along the track 63, the lower portion 61 thereof is appreciably widened.

Axial travel of the contact ring and the yoke is effected by means of a threaded feed screw 64 engaging a tapped hole in the lower portion 61 of the yoke. A reduced portion 65 of the feed screw 64 is journaled in the upright 14, and a control handle 66 is secured to the outer end of the feed screw for manipulation by the operator. When it is desired to adjust the output speed of the device, the operator merely turns the control handle 66 which moves the contact ring 57 into engagement with a section of the cones 49 having a different diameter. As will be explained more in detail hereafter, this effects a change in the ratio of the speeds of the field and armature, and since the sum of their absolute speeds is constant, it follows that a change has been made in the speeds available at the load pulleys 20 and 34.

It should now be apparent that the position of the contact ring 57 determines the speeds at which the field and armature rotate. For example, when the contact ring 57 is at a position at the large ends of the cones 49 such that the ratio of the internal diameter of the contact ring to the outer diameter of the cones at their points of contact with the ring is equal to the ratio of the pitch diameter of the ring gear 41 to the pitch diameter of the planet gears 56, the armature 16 and the spider 44 turn at full motor speed whereas the field 22 and the ring gear 41 stand still. As the contact ring 57 is shifted to a smaller part of the cones 49, a differential is produced in the ratios mentioned above which results in decreasing the speed of the spider and armature. As the armature slows down, the speed of the ring gear and the field is increased since the armature speed plus the field speed always equals full motor speed. The armature and spider of course revolve in one direction while the field and ring gear revolve in the opposite direction. The parts of the device are preferably proportioned so that shifting the contact ring 57 from the ends 50 of the cones to the ends 51 varies the armature speed from full motor speed to half speed and the field speed from zero to half speed. Since the load can be driven from either the armature pulley 20 or the field pulley 34, it is obvious that all speed from zero to full motor speed are available. Reversing the motor 11 makes these two speed ranges available in either direction.

The invention can of course be arranged to give speed ranges other than those described above by properly proportioning the cones, contact ring, ring gear and planet gears, but a limitation is placed upon the practical speed ranges by the permissible relative sizes between the small end of the cones and the contact ring. Decreasing the diameter of the small end of the cone relative to the internal diameter of the contact ring affords a greater speed range but also decreases the "wrap" available, or the area of contact between the cone and contact ring, and slippage occurs. The present invention overcomes, to a large extent, the practical limitations placed upon the speed ranges of prior structures by utilizing the entire length of the cones for each of two speed ranges. Not only is a much wider range of speed available with equipment of comparable size and cost, but the device is more stable since incremental movements of the ring cause a smaller speed variation than when the length of the cones must be divided to give both ranges. Thus minor accidental shifting of the contact ring does not cause as great a change in speed as in other devices used for varying the speed of a motor.

The capacity of my device is also enhanced by the provision of compression springs 67 and 68 which are positioned in recesses 69 and 70 formed in the arms 47 and 48 respectively of the spider 44. As clearly shown in the drawings, the bearings 54 and 55 supporting the cones 49 are mounted in elongated apertures 71 in the arms 47 and 48. In this manner limited radial movement of the cones is provided and the cones are urged into contact with the contact ring 57 by the springs 67 and 68.

The amount of power which can be taken from the device without slippage is dependent upon the normal pressure which can be exerted between the cones and the contact ring at their points of engagement. In addition, the allowable pressure is limited by the ability of the materials to withstand the friction between the cones and the ring. Since the frictional loss is less at low speeds than at high speeds, it follows that a greater pressure can be exerted upon the smaller ends of the cones than at the larger ends since the smaller ends produce speeds of only half motor speed. Accordingly, the springs 67 at the smaller end of the cones 49 are stronger than the springs 68 thereby allowing a greater load to be driven.

In the event any slippage occurs between the cones and the contact ring, its detrimental effect is minimized since it is divided between the two pulleys 20 and 34, only one of which is normally loaded.

In connection with the power output available from my variable speed electric motor, it should be noted that the entire torque is not carried by the transmission unit 12. Since both the field 22 and the armature 16 are free to revolve and are connected to the load pulleys 34 and 20 respectively, it is apparent that a portion of the load torque is exerted through the air gap 40 between the field and armature coils. This torque is directly transmitted to the load and does not place any burden upon the transmission unit 12. Accordingly, the transmission unit need only be designed to withstand that portion of the total torque which is transmitted by it, and a large saving in size and cost is possible.

The operation of my device is extremely simple. If it is desired to operate the load within the speed range from zero to half motor speed, the load is connected to the pulley 34 which rotates in unison with the field 22. If, on the other hand, the desired speeds are within the range from half to full motor speed, the load is driven from the pulley 20 on the armature shaft. The pulleys 20 and 34 normally revolve in opposite directions, and the most advantageous direction of rotation for the particular pulley used can readily be obtained by simply reversing the motor if necessary. By means of the control handle 66 the operator can easily select the exact speed at which the load is to be driven. To aid in determining the speed, any suitable speed indicating device may be attached to the mechanism. The speed may also be indicated by calibrating the control 66.

As more specifically described above, the speed of the device may be varied continuously throughout the entire range, making available an infinite number of available speeds. For any given position of the contact ring 57 along the cones 49, a definite ratio is set up between the armature and field speeds. The relationship of the speeds available for any setting of the contact ring 57 is expressed by the following equation:

$$1 + \frac{S'}{S} = \frac{D_c}{d_c} \times \frac{d_g}{D_g}$$

where $S$ = speed of armature and of pulley 20.
$S'$ = speed of field and of pulley 34.
$D_c$ = internal diameter of ring gear.
$d_c$ = diameter of cone at contact point.
$D_g$ = pitch diameter of ring gear.
$d_g$ = pitch diameter of plant gear.

Inasmuch as the full rated motor speed can be easily determined and is always equal to $S+S'$, the above equation can be used to determine the speed of each of the pulleys 20 and 34 for any adjustment of the device.

Although I have herein disclosed a particular embodiment of my invention, it will be understood that numerous changes may be made without departing from the scope of the invention, and I do not intend to limit the same except as defined in the appended claims.

What I claim as my invention is:

1. An electric motor comprising a base, armature and field elements each rotatable relative to said base and also rotatable relative to each other, a ring gear rotatable as a unit with one of said motor elements, a spider rotatable as a unit with the other of said motor elements, a planet gear journaled in said spider and meshing with the ring gear, and a speed regulating device associated with said spider for varying the relative speed between said spider and said ring gear.

2. An electric motor comprising a base, armature and field elements each rotatable relative to said base and also rotatable relative to each other, a ring gear rotatable as a unit with one of said motor elements, a spider rotatable as a unit with the other of said motor elements, a tapered roller journaled in said spider, a planet gear secured to one end of said roller and meshing with the ring gear, and a contact ring frictionally engaging the tapered roller and adjustable lengthwise of the roller to vary the speeds of the armature and field elements relative to each other and relative to the base.

3. An electric motor comprising a base, armature and field elements each rotatable relative to said base and also rotatable relative to each other, a ring gear rotatable as a unit with one of said motor elements, a spider rotatable as a unit with the other of said motor elements, a tapered roller journaled in said spider, a planet gear secured to one end of said roller and meshing with the ring gear, a contact ring frictionally engaging the tapered roller and adjustable lengthwise of the roller to vary the speeds of the armature and field elements relative to each other and relative to the base, and means for driving a load from both the armature element and the field element.

4. An electric motor comprising a base, a revoluble armature element, a revoluble field element, a ring gear connected to one of said revoluble elements, a carrier connected to the other of said revoluble elements, a plurality of tapered cones journaled in said carrier, a planet gear connected to each of said cones and engageable with the ring gear, a contact ring mounted on said base and arranged to frictionally engage the outer peripheries of the cones, means for adjusting the contact ring lengthwise of the cones to enable frictional contact to be made between the cones and the ring at various diameters of the cones to vary the speeds of the armature and field elements, and means for driving a load from either the armature element or the field element.

5. A motor having its two elements mounted for rotation in opposite directions, a variable speed transmission of the planetary type between and connected with the two elements of the motor, and a driven shaft connected to one of the motor elements to receive torque therefrom and also connected to the variable speed transmission to receive torque transmitted through said transmission.

6. An electric motor comprising a revoluble armature element, a revoluble field element, a ring gear connected to one of said revoluble elements, a carrier connected to the other of said revoluble elements, a cone journaled in said carrier and having a limited radial movement with respect to the axis of the carrier, springs mounted in said carrier and urging the cone radially outward, a planet gear secured to one end of the cone and meshing with the ring gear, and a contact ring frictionally engaging the cone and adjustable lengthwise of the cone to vary the speeds of the armature and field elements.

7. An electric motor comprising a revoluble armature element, a revoluble field element, a ring gear connected to one of said revoluble elements, a carrier connected to the other of said revoluble elements, a cone journaled in said carrier, a planet gear secured to one end of the cone and engageable with the ring gear, an adjustable contact ring frictionally engageable with the cone, and means for exerting a greater pressure between the cone and the contact ring when the latter is at the small end of the cone than when it is at the large end of the cone.

8. An electric motor comprising a revoluble armature element, a revoluble field element, a ring gear connected to one of said revoluble elements, a carrier connected to the other of said revoluble elements, a cone journaled in said carrier, a planet gear secured to one end of the cone and engageable with the ring gear, an adjustable contact ring frictionally engageable with the cone, and a spring mounted in the carrier opposite each end of the cone and urging the cone radially outwardly, the spring at the small end of the cone being stronger than the spring at the larger end of the cone.

9. In an electric motor having a revoluble armature and a revoluble field, means for delivering power to a load from either the revoluble armature or the revoluble field, a variable speed transmission unit connecting the armature and the field for varying the speed of each of the latter, and fixed means frictionally engaging a movable part of the transmission unit for taking the reaction of the motor.

10. In an electric motor having a revoluble armature and a revoluble field, means for delivering power to a load from either the revoluble armature or the revoluble field, a variable speed transmission unit of the planetary type connecting the armature and the field, and means for adjusting the transmission unit to enable power to be taken from the armature within one range of speeds and to enable power to be taken from the field at another range of speeds.

11. An electric motor comprising a revoluble armature element, a revoluble field element, a gear driven by one of said motor elements, a gear carried by the other of said motor elements and movable in an orbital path about said first mentioned gear and meshing therewith, and means for varying the rotational speed of said second mentioned gear about its own axis to vary the speeds of the armature and field elements.

12. An electric motor comprising a revoluble armature element, a revoluble field element, a gear driven by one of said motor elements, a frame driven by the other of said motor elements, a tapered roller journaled in said frame, a gear operatively connected to said roller and meshing with said first mentioned gear, and a member frictionally engaging said roller and adjustable relative to the roller to vary the speeds of the armature and field elements.

13. An electric motor comprising a revoluble armature element, a revoluble field element, a gear driven by one of said motor elements, a frame driven by the other of said motor elements, a tapered roller journaled in said frame, a gear operatively connected to said roller and meshing with said first mentioned gear, a member frictionally engaging said roller and adjustable relative to the roller to vary the speeds of the armature and field elements, and spring means for yieldably urging said member and said tapered roller toward each other.

RICHARD C. UPTON.